Patented Nov. 6, 1945

2,388,393

UNITED STATES PATENT OFFICE 2,388,393

INSECTICIDE

Hans J. Diem, Bradenton, Fla.

No Drawing. Application September 9, 1942,
Serial No. 457,757

4 Claims. (Cl. 167—24)

This invention relates to an insecticide and a process for producing the same, and more particularly to that type of insecticide which is derived as a powder or liquid extractive from a plant having insecticidal properties.

It is a principal object of my invention to provide an insecticide of good insecticidal properties which is derived from a plant of domestic origin and which may be sprayed as a liquid or dusted as a powder upon the insects to be destroyed.

It is a further object of my invention to produce an insecticide base or activator which may be mixed with fillers and an additive of other known forms of commercial plant derived insecticides to provide an insecticide composition of high quality in which the killing power of the activator is not affected by the presence of the additive or filler.

It is also an object of my invention to provide an insecticide base derived from a domestic plant source which will have a killing power comparable to the previously known plant insecticides obtained from foreign sources and which may be combined with organic or inorganic additives to produce either a dust or liquid spraying mixture of good quality.

I have found that the plant *Pyconthymus rigidus* is possessed of excellent insecticide properties. This plant is a native of Florida, and so far as I am aware cannot be found elsewhere. The plant is sometimes referred to as wild savory, and may be identified as a fragrant shubby mint which grows abundantly in the sandy soil of the dry pine lands of Florida. It may be easily recognized by its low growth of woody stems, evergreen needle-like leaves which are less than an inch long and very dense, and oblong silky heads of small pale flowers, purple in color and spotted with a darker color on the lower lip. The odor of the whole plant is somewhat similar to that of Pennyroyal.

As one suitable process for obtaining an insecticide from *Pycnothymus rigidus*, I first dry any part of the plant and then pulverize it to a fine powder of at least 200 mesh. The resultant product can be used in this form as a very powerful dust or powder insecticide. While I prefer to grind only the leaves to a fine powder to produce the insecticide, it should be understood that an insecticide can be obtained by grinding any or all parts of the plant, such as the roots, stems, leaves, seed pods, and flowers. The insecticide powder obtained as described is very effective to control the Mexican bean beetle, the European cabbage worm, the looper, and aphids.

The insecticide dust obtained by grinding the *Pycnothymus rigidus* is also of value as an activator when used in combination with other known commercial types of insecticides of the group derived from plant origins. For example, the dust of *Pycnothymus rigidus* may be mixed with insecticide powders obtained from derris, cube, timbo, pyrethrum, tobacco and many other similar substances of this type. The *Pycnothymus rigidus* activator can also be mixed with suitable fillers such as clay or the filler may be an alkaline filler such as lime. It may be pointed out that the previous known plant insecticides such as cube, derris, timbo and pyrethrum will lose their killing power when mixed with alkaline fillers such as lime but that my activator of ground *Pycnothymus rigidus* does not lose its killing power when mixed with alkaline fillers such as lime. The powdered *Pycnothymus rigidus* also mixes readily with arsenic and fluorine compounds such as are widely used in plant insecticidal compositions.

As examples of a practical and complete dust mixture of insecticide properties employing an activator of ground *Pycnothymus rigidus* and mixed with fillers and additives of other commercial insecticides I give the following:

Example A

| | Pounds |
|---|---|
| Activator—(*Pycnothymus rigidus*) | 30 |
| Beta thiocyano ethyl esters of aliphatic fatty acids averaging 10 to 18 carbon atoms | 2 |
| Sulfur | 15 |
| Filler (clay, lime or any other suitable materials known as fillers for insecticide compounds) | 53 |

In the example above, the insecticidal composition is prepared in powdered form and is used to dust the crops. The beta thiocyano ethyl is added to this formula since it increases the killing power of the resultant mixture. It will be noted that this formula also includes a fairly large proportion of sulfur which is a repellant and sterilizer against certain forms of fungi. I have found that the killing power of the activator is not reduced when mixed with these additives.

Example B

| | Pounds |
|---|---|
| 5% cube or derris | 4 |
| Activator—(*Pycnothymus rigidus*) | 20 |
| Tobacco dust | 20 |
| Beta thiocyano ethyl esters of aliphatic fatty acids averaging 10 to 18 carbon atoms | 2 |
| Filler (clay, lime or any other suitable materials known as fillers for insecticide compounds) | 54 |

This formula includes a mixture of the previously known plant insecticides such as cube or derris together with the activator of my invention. A large proportion of tobacco dust is also employed and I have found that this formula gives a potent and powerful insecticide which, when dusted upon the plants, gives a very quick kill, requiring from 10 to 16 hours. In both of the examples given above, the filler is, of course, added as an extender to increase the bulk of the mixture and enhance its covering properties.

While I have thus far described the use of *Pycnothymus rigidus* as an insecticide or activator in the form of a dust or powder mixture, it is also feasible to use the plant as a liquid extractive and its insecticidal value in this form is very good. Since it may be desirable to spray the insecticide in liquid form as distinguished from dusting a powder on the plants to be treated, the liquid form of insecticide can be best obtained by extracting the insecticidal properties from the plant with an organic solvent or the like. The extractive of *Pycnothymus rigidus* may be obtained by any of the known processes of obtaining insecticide extractives from plants. Examples of suitable solvents for the extraction process are carbon tetrachloride, chloroform, acetone, and other similar organic solvents. When extracting the insecticidal properties from *Pycnothymus rigidus* the solvents may be used in varying proportions depending upon the desired strength of the resultant extractive. An example of a suitable extraction process would be to mix the plant and the solvent in a 50—50 proportion. The resultant extractive may be used in diluted strength the same as the extractives of rotenone or pyrethrum mixtures are used. That is to say, the extractive may be diluted with water within a range of 1 to 200 to 1 to 400.

The liquid extractive obtained from *Pycnothymus rigidus* may be mixed with liquid extractives of other plants known to have insecticidal properties, such as cube, timbo, etc., and it will be found that the *Pycnothymus rigidus* extractive, when used as an activator in the composition, will greatly increase the covering power or bulk and the lethal effectiveness of such mixtures.

I believe that the insecticide obtained from *Pycnothymus rigidus* should be classified as a non-poisonous insecticide since it is known that the leaves of this plant have been used by the Seminole Indians and other residents of the Florida Everglades as a laxative. The leaves of the plant can be used to form a brew similar to tea and when taken internally will have a laxative effect without any ill effects upon the person who has used it. I have even known of the brew being administered to small children without having any ill effects.

While I have given specific examples of insecticide compositions using *Pycnothymus rigidus* as an activator it should be understood that I do not wish to be limited to these exact compositions and I claim for my invention the use of *Pycnothymus rigidus* in either powdered or liquid form as an insecticide alone or in combination with desirable additives and other known types and forms of either organic or inorganic insecticides.

I claim:

1. A liquid insecticide extractive comprising a mixture of *Pycnothymus rigidus* and an organic solvent.

2. An insecticide composition comprising a mixture of ground *Pycnothymus rigidus* and a filler.

3. An insecticide composition comprising a mixture of ground *Pycnothymus rigidus* and an alkaline filler.

4. A liquid insecticide comprising an extract of *Pycnothymus rigidus*.

HANS J. DIEM.